United States Patent
Räisänen

(12) 
(10) Patent No.: US 6,502,090 B1
(45) Date of Patent: *Dec. 31, 2002

(54) ELECTRONIC DATA SEARCHING METHOD AND APPARATUS

(75) Inventor: Harri Räisänen, Vuorentausta (FI)

(73) Assignee: Nokia Mobile Phones Limited, Espoo (FI)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/052,656

(22) Filed: Mar. 31, 1998

(30) Foreign Application Priority Data

Apr. 1, 1997 (FI) ................................................ 971331

(51) Int. Cl.⁷ ............................................... G06F 17/00
(52) U.S. Cl. ........................................ 707/3; 707/102
(58) Field of Search ............... 707/1–206; 709/226–238

(56) References Cited

U.S. PATENT DOCUMENTS

| | | | |
|---|---|---|---|
| 4,453,217 A | 6/1984 | Boivie | 364/300 |
| 5,224,205 A * | 6/1993 | Dinkin et al. | 709/226 |
| 5,479,476 A | 12/1995 | Finke-Anlauff | 379/58 |
| 5,586,261 A * | 12/1996 | Brooks et al. | 709/238 |
| 5,745,680 A * | 4/1998 | Brooks et al. | 709/227 |
| 5,786,819 A | 7/1998 | Weiser et al. | 345/354 |
| 5,930,703 A * | 7/1999 | Cairns | 455/418 |
| 5,982,876 A | 11/1999 | Albesa | 379/354 |
| 6,049,796 A * | 4/2000 | Siitonen et al. | 707/3 |

FOREIGN PATENT DOCUMENTS

| | | |
|---|---|---|
| EP | 0 457 077 A2 | 11/1991 |
| EP | 0 624 965 A2 | 11/1994 |
| EP | 0 755 142 A2 | 1/1997 |
| EP | 0 876 036 A2 | 11/1998 |
| WO | WO 93/14589 | 7/1993 |

* cited by examiner

*Primary Examiner*—David Jung
(74) *Attorney, Agent, or Firm*—Perman & Green, LLP

(57) ABSTRACT

A mobile communications device has a display screen (1), Down-Scroll and Up-Scroll switches (3,4), left and right soft switches (5,6), and a memory (9) for storing a directory of names and respective telephone numbers. In a search mode operation mode, one of the stored names is displayed on the display screen (1) and a Search Key is defined as the first character of that name. Using the right soft switch (6), the Search Key can be extended to include one or more subsequent characters of the displayed name. Using the left soft switch (5), the Search Key can be shortened to remove characters from the key. The stored directory can then be searched in alphabetical order to identify a first subsequent entry not commencing with the extended search key and the identified entry displayed if one exists.

23 Claims, 5 Drawing Sheets

ELECTRONIC DATA SEARCHING METHOD AND APPARATUS

FIELD OF THE INVENTION

The present invention relates to a method of searching alphanumeric data stored in electronic form and to apparatus for implementing this method. The invention is applicable in particular, though not necessarily, to mobile communication devices which store a directory of names and respective telephone numbers.

BACKGROUND OF THE INVENTION

Conventional mobile telephones have electronic digital memories in which can be stored directories of names and respective telephone numbers. It is not uncommon for these memories to be able to store several hundred individual entries in which case searching through the stored directory can be a complex operation. For telephones with extensive keypads, two search options are generally provided. The first option involves the use of 'up' and 'down' switches to scroll through the directory in alphabetical order, one entry at a time, with the currently selected entry (either name or number) being displayed on a display of the telephone. The second search option is to enter a search key (or search key variable) consisting of the first character, or a number of initial characters, of a name to be searched for, and to commence the search operation by pressing an 'enter switch'. The first name in the directory that matches the search key is displayed on the display. If this name is not the one that the user requires, then previous or subsequent entries can be selected by use of the up and down switches.

There is however an ongoing desire to miniaturise mobile telephones and other mobile communication devices and one way in which this is being achieved is by reducing the number of user switches; in particular, alphanumeric character entry switches are being removed. This of course makes conventional fast searching by directly entering the first letter or first few letters of a name impossible. Several 'reduced switch' search methods have been proposed to overcome this problem. For example, WO93/14589 discloses a mobile telephone in the form of a pen in which a cap of the pen is rotatable in a 'name directory display mode' to enable the user to scroll through a stored directory. Slow rotation of the cap causes the directory to be scrolled through one entry at time whilst rapid rotation of the cap causes the directory to be scrolled in steps of a fixed interval, e.g. five names at a time. WO93/14589 also considers stepping between the first name entries beginning with each different letter of the alphabet, i.e. from the first entry beginning with 'A' to the first entry beginning with 'B' and so on, in response to rapid rotation of the cap.

It is an object of the present invention to provide an improved method of searching a stored directory of alphanumeric entries using a reduced number of search switches.

SUMMARY OF THE INVENTION

According to a first aspect of the present invention there is provided a method of selecting an entry from a directory of alphanumeric entries stored in electronic form in the memory of an electronic device having a display and at least one user actuatable search switch, the method comprising the steps of:

(1) displaying one of said entries on the display and defining as a search key the first character of that entry;

(2) using said search switch to extend the search key to include one or more subsequent characters of the displayed entry, where the number of characters making up the extended search key is n; and (3) searching the directory of entries in alphabetical order to identify a first subsequent entry not commencing with the extended search key, and displaying the identified entry if one exists.

Preferably, the search key is extended by one character each time the search switch is actuated, whilst the electronic device is operated in an 'extended key mode'. The method may comprise the step of responding to actuation of a second search switch to shorten the extended search key by removing one or more of said subsequent characters from the key. Again, the extended search key may be shortened by one character each time the second search switch is actuated, whilst the electronic device is operated in the 'extended key mode'.

Preferably, following the search, the search key is redefined as the first character or characters of the identified entry, sufficient to distinguish the search key by one character from the beginning of the previously displayed name. Optionally, steps (2) and (3) may be repeated based upon the new search key and the newly displayed entry.

Preferably, said searching of the directory of entries using the search key may be commenced following actuation of the first mentioned search switch for a period of time greater than a predetermined initial time period. More preferably, following the elapse of each further predetermined time period after the initial period, step (3) is repeated using the new extended search key as defined in the preceding paragraph. In one embodiment of the present invention, in response to actuation and subsequent deactuation of the search switch before elapse of the initial time period, the searching step comprises first determining if the next entry in alphabetical order commences with the extended search key. If yes, then the search is stopped and the currently displayed entry continues to be displayed. If no, then that next entry becomes said identified entry and is displayed. The search key is defined by the first character or characters of the identified entry, sufficient to distinguish the search key by one character from the beginning of the previously displayed name.

In another embodiment of the invention, the method is responsive to actuation of a 'Down-Scroll' switch to replace the currently displayed entry with the next entry in alphabetical order. In particular, the method may be so responsive following actuation of the Down-Scroll switch for a time period less than some predetermined time period. The method may respond to actuation of the Down-Scroll switch for a time period greater than that predetermined time period by displaying in alphabetical order the first entry stored for each letter of the alphabet. The method may respond to actuation of an 'Up-Scroll' switch by similarly stepping through the directory and displaying selected entries, but in reverse alphabetical order.

Preferably, the method comprises restricting the search in step 3) to those entries which differ from the Search Key only by the final character of the Search Key. More preferably, the search continues cyclically for the entries searched, i.e. after display of the final entry, the first entry containing the Search Key is again displayed and the search repeated.

According to a second aspect of the present invention there is provided apparatus having an electronic memory for storing a directory of alphanumeric entries, the apparatus further comprising;

a display;

at least one user actuatable search switch; and signal processing means coupled to said user actuatable switch, for detecting actuation thereof, and to said display, the signal processing means being arranged to display one of said entries on the display and to define as a search key the first character of that entry, to respond to actuation of the search switch by extending the search key to include one or more subsequent characters of the displayed entry, to search the directory of entries in alphabetical order to identify a first subsequent entry not commencing with the extended search key, and to display the identified entry if one exists.

According to a third aspect of the present invention there is provided a mobile communications device comprising:

a display;

at least one user actuatable search switch; and signal processing means coupled to said user actuatable switch, for detecting actuation thereof, and to said display, the signal processing means being arranged to display one of said entries on the display and to define as a search key the first character of that entry, to respond to actuation of the search switch by extending the search key to include one or more subsequent characters of the displayed entry, to search the directory of entries in alphabetical order to identify a first subsequent entry not commencing with the extended search key, and to display the identified entry if one exists.

Whilst the present invention is particularly applicable to mobile telephones it will be appreciated that the invention is applicable to all electronic devices in which alphanumeric entries are stored and in which it is desirable to be able to conduct rapid searches of the stored data using only a very few user actuatable switches. These devices include personal organisers (or personal data assistants–PDAs) and combined mobile phone and PDA devices.

DETAILED DESCRIPTION

Figure 1:
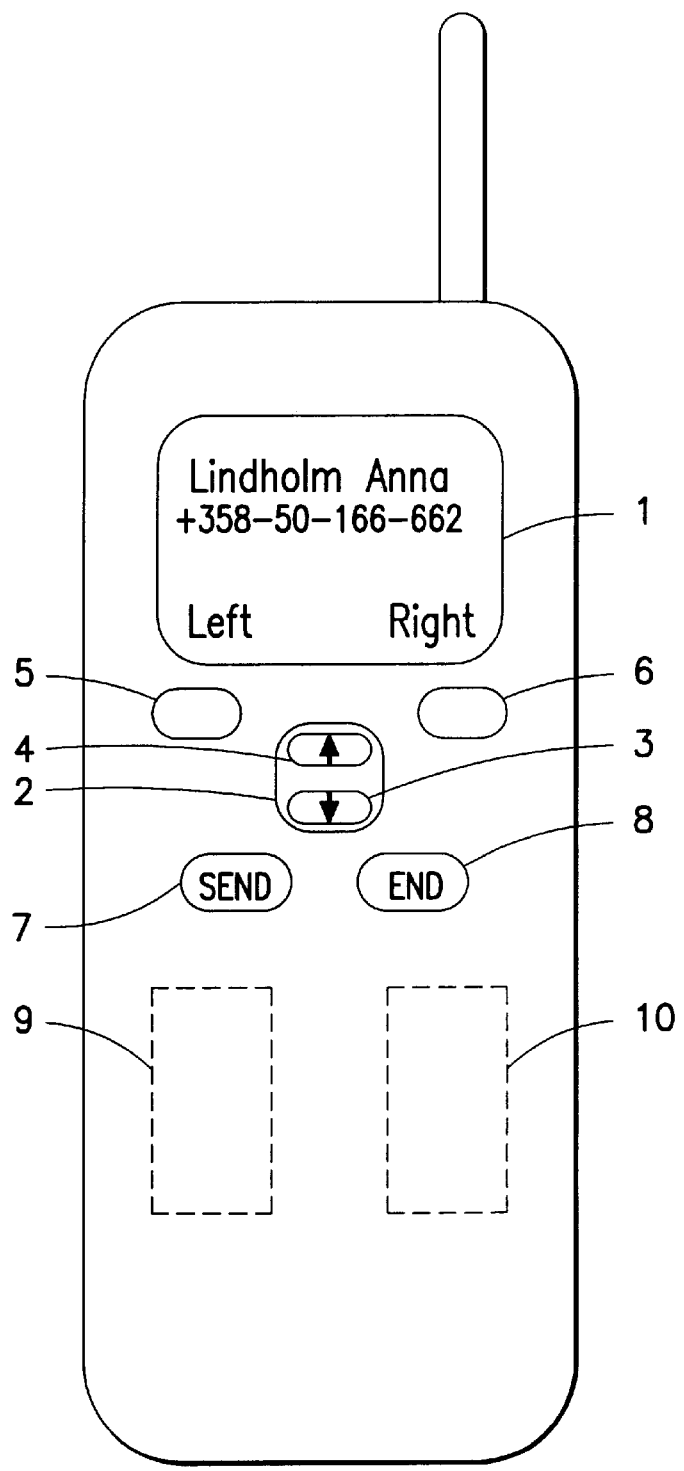
FIG. 1 illustrates schematically a mobile telephone embodying the present invention.

With reference to FIG. 1(a), a mobile phone suitable for implementing the search method set out hereinbelow has an LCD display screen 1, a rocker switch 2 which has a lower 'Down-Scroll' switch 3 and an upper 'Up-Scroll' switch 4, and left and right 'soft' switches 5,6. Whilst the function of the Down-Scroll and Up-Scroll switches 2,3 is permanently defined as scrolling do wn and up menus displayed on the screen 1, the function of the soft switches changes depending upon the mode of operation of the telephone. The telephone also has a 'Send' and 'End' switches 7,8 that perform on-hook and off-hook functions in a known manner. Telephone numbers and associated names are stored in an internal memory 9 of the telephone. This memory 9 may be an intrinsic part of the phone's circuitry or may be provided (for example with GSM phones) on a SIM card which can be inserted into the phone by a user. The memory may also be provided by a combination of an intrinsic circuit component by way of a memory device on a SIM card. The telephone contains a microprocessor 10 that performs signal processing operations as set out below.

When any one of the Down-Scroll, Up-Scroll, left or right soft switches 3 to 6 is actuated by a user, the microprocessor 10 detects this actuation and causes the phone to enter a 'search mode' in which the user can search through the stored directory of names for a particular name or query. When the search mode is first entered, the microprocessor 10 will obtain the first name in alphabetical order from the stored directory and will display this name on the display screen 1. The phone is then in the ready state and the display will display the message 'Ready'.

Figure 2:
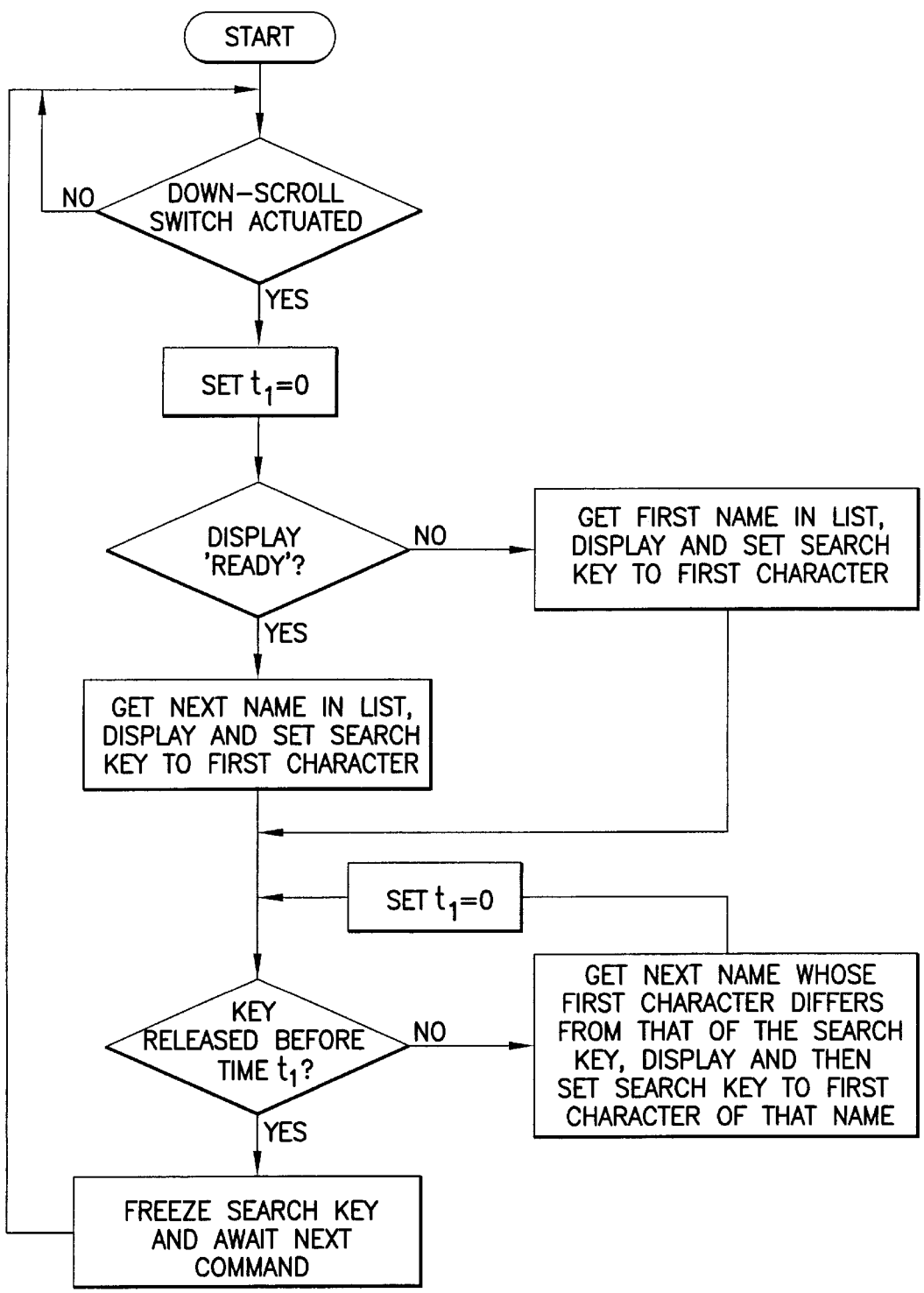
FIG. 2 is a flow chart showing the function of a 'Down-Scroll' switch of the telephone of FIG. 1.

The function of the Down-Scroll switch 3 in the name search mode will now be described with reference to FIG. 2. When this switch 3 is pressed or actuated by the telephone user for a short period less than some predefined time period $t_1$ (typically around 0.5 seconds), the next name in alphabetical order is identified from the stored entries and the currently displayed entry replaced with this next entry. Further actuations of the Down-Scroll switch 3 for time periods of less than $t_1$ similarly cause the display 1 to be 'updated' with the next stored entry.

In order to enable a more rapid search of the stored names to be performed, the telephone responds to continuous actuation of the Down-Scroll switch 3 for a period in excess of $t_1$ by displaying in sequence the first names, in alphabetical order, for each letter of the alphabet, i.e. the letters of the alphabet provide in turn a Search Key. That is to say that if the first name beginning with the letter 'A' is initially displayed, continuous actuation of the Down-Scroll switch 3 will cause the first name beginning with 'B' to be displayed, then the first name beginning with 'C' etc. When the Down-Scroll switch 3 is released, the name currently displayed will remain displayed and the user can call the number associated with the displayed name by pressing the 'Send' switch 7. Alternatively, the user can search for another name, either above or below the displayed entry, using single presses of the Down-Scroll switch 3 or the Up-Scroll switch 4 (see below). The currently defined Search Key may be identified to the user by underlining the first character of the displayed name.

Figure 3:
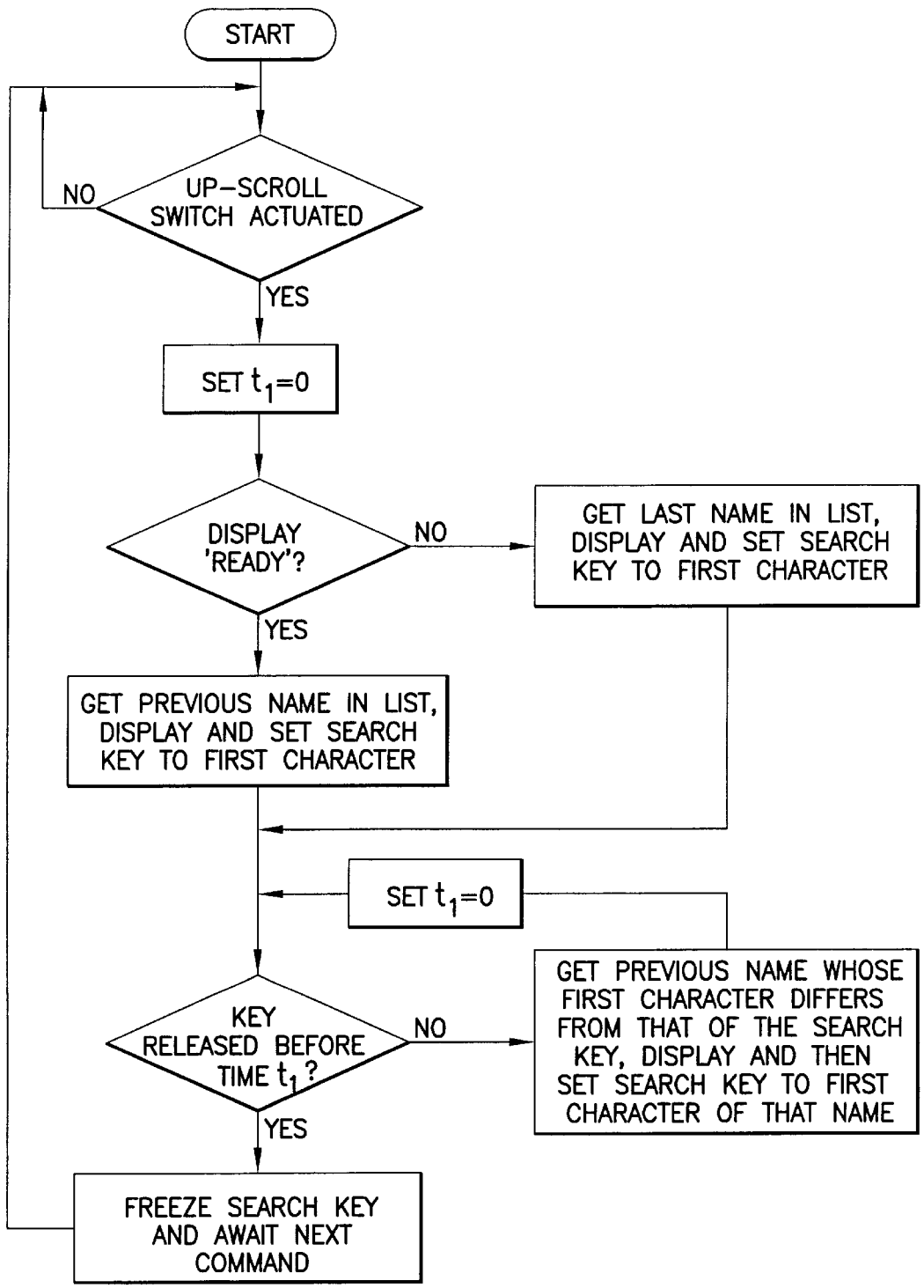
FIG. 3 is a flow chart showing the function of an 'Up-Scroll' switch of the telephone of FIG. 1.

The function of the Up-Scroll switch 4 is illustrated in FIG. 3 and is identical to that of the Down-Scroll switch except that the Up-Scroll switch steps through the stored entries in reverse alphabetical order.

Figure 4:
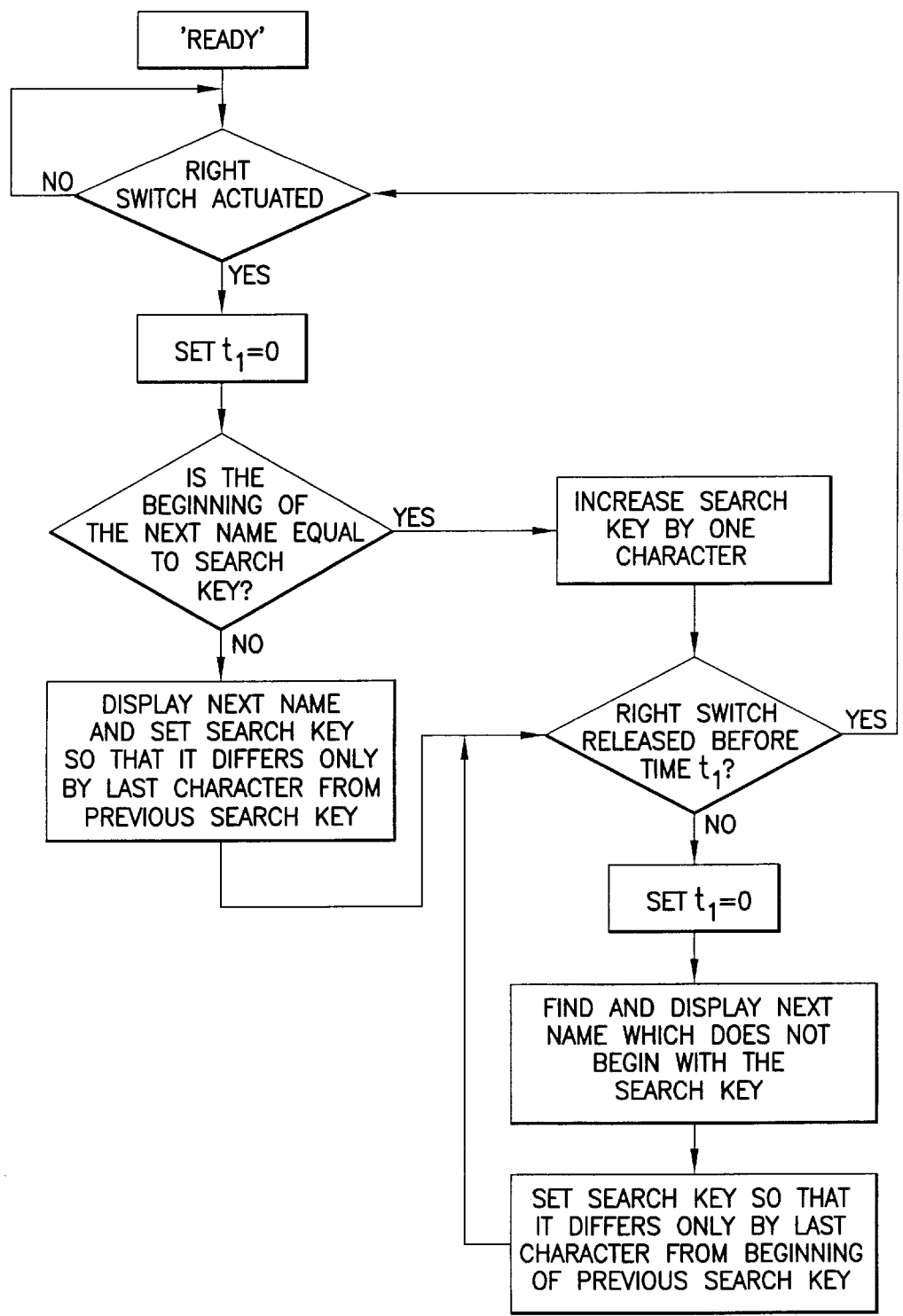
FIG. 4 is a flow chart showing the function of a 'Right' soft switch of the telephone of FIG. 1.

The function of the right soft switch 6 will be described with reference to the flow chart of FIG. 4. As already described, in the ready state a name is displayed on the screen 1 and the Search Key is set to the first letter of the displayed name. When the right soft switch is first pressed, the timer is reset and the name in the directory which immediately follows the displayed name is examined to determine whether or not the beginning of that next name differs from the Search Key. If there is a difference, then the next name is displayed and the Search Key is redefined as the first letter of the name. If no difference exists, then the current name remains on the display and the Search Key is increased by one character. If the right switch is then released before time $t_1$, the display returns to the 'Ready' state and awaits the next switch actuation. If the right switch is not released before $t_1$, then the timer is reset and the following names in the directory are searched in order, to find the first name whose beginning differs from the Search Key. This name is then displayed and the Search Key defined using the beginning of that name, again so that the Search Key differs by its last character from the beginning of the previously displayed name. If the right switch has still not been released, the search is repeated. Upon release of the switch, the display returns to the 'Ready' state with the Search Key frozen.

If following initial actuation of the right switch the next name in the directory commences with the defined Search Key, and if the switch is not released before $t_1$, then a search is immediately conducted for the next name which differs from the Search Key, as described above.

It will be appreciated that by pressing and releasing the right switch a number of times, it is possible to define a Search Key containing several characters, providing that at least one subsequent name also commences with the defined Search Key. Once the Search Key has been defined, by continuing to press the switch, the display will 'jump' to the next name in the directory which does not begin with the defined Search Key.

By way of illustration, use of the four search switches is demonstrated for a telephone in which the following names (together with associated telephone numbers which are not shown here) are stored in the memory 9 of the telephone. This directory represents only a portion of a complete directory which is typically stored in a phone.

| | |
|---|---|
| Johnson | Craig |
| Kay | John |
| Laine | Eila |
| Lainela | Olavi |
| Leminen | Kirsi |
| Lidman | Elis |
| Lidoff | Peter |
| Liede | Verna |
| Leiho | Tommy |
| Liehunen | Matti |
| Liemola | Olli |
| Lihavainen | Pertti |
| Lihri | Bengt |
| Lihtamo | Matti |
| Lilja | Jouni |
| Lind | Peter |
| Linden | Tony |
| Lindeqvist | Aila |
| Linder | Nina |
| Lindevall | Minna |
| Lindfors | Pekka |
| Lindholm | Anna |
| Ljunglin | Siri |
| Lohi | Jarmo |
| Lokka | Pirjo |
| Lumme | Anja |
| Malinen | Janne |
| Macgregor | Archie |
| Sivalumpi | Ernie |

A) Pressing down arrow switch, releasing, and repeating: Johnson Craig; Kay John; Laine Eila; Lainela Olavi; Leminen Kirsi; Lidman Elis; Lidoff Peter; Liede Verna . . . . etc B) Pressing down arrow switch continuously: Johnson Craig; Kay John; Laine Eila; Malinen Janne; Sivalumpi Ernie . . . . etc 3) Pressing up arrow switch has same effect as down arrow switch but in reverse.

4) Pressing right arrow switch when at the top of the directory:

Say for example we wish to locate Lohi Jarmo.

a) Find Laine Eila using 2)

b) Press right arrow switch once and hold down: Laine Eila; Leminen Kirsi; Lidman Elis; Ljunglin Siri; Lohi Jarmo.

Say we wish to locate Lindholm Anna a) Find Laine Eila using 2)

b) Press right arrow switch once and hold down: Laine Eila; Leminen Kirsi; Lidman Elis.

c) Press right arrow switch again and hold down: Lidman Elis; Liede Verna; Lihavainen Pertti; Lilja Jouni; Lind Peter.

d) Press right arrow switch and release: Lind Peter.

e) Press right arrow switch and hold down: Linden Tony; Lindfors Pekka; Lindholm Anna.

5) Pressing left arrow switch merely reduces search key by one character for each switch press.

Figure 5:
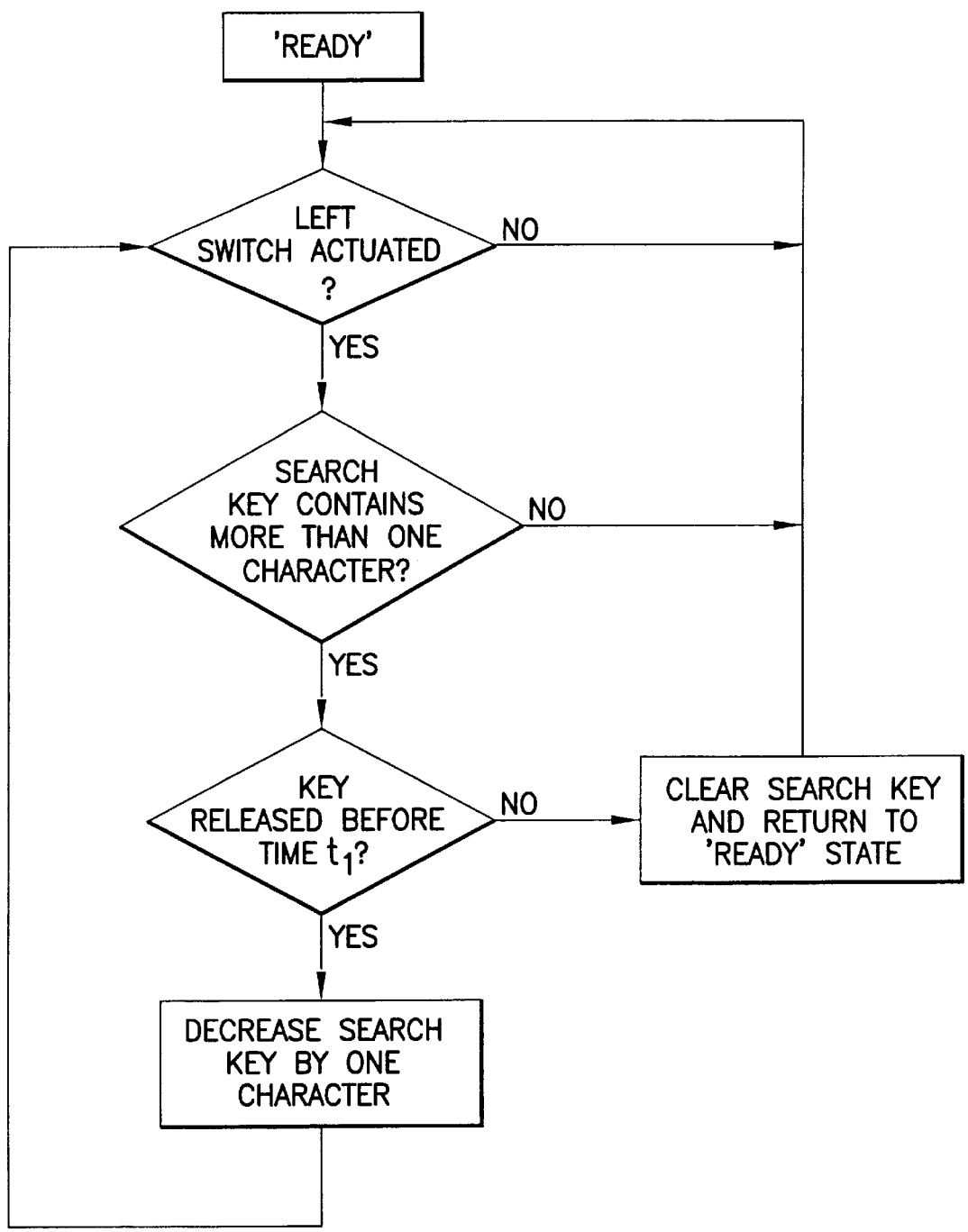
FIG. 5 is a flow chart showing the function of a 'Left' soft switch of the telephone of FIG. 1.

The flow chart of FIG. 5 shows the function of the left soft switch 5. Pressing and releasing this switch before time $t_1$ will result in the last character of the Search Key being removed from the Key. Continuous actuation of the switch for a time greater than $t_1$ will result in the Search Key being reduced to only the first character of the displayed name. Actuation of the left switch does not change the display, other than to delete underlining of characters removed from the Search Key.

It will be appreciated that various modifications may be made to the above described embodiment without departing from the scope of the present invention. For example, upon continuous activation of the right arrow switch, the search may be restricted to those names which differ from the Search Key by only one character. Thus, for example, if the name 'Linden' from the above list is displayed and the Search Key is defined as 'Linden', then the search will only be conducted through those names beginning with 'Linde', i.e. Linden, Lindeqvist, Linder, and Lindevall. If the right arrow switch remains actuated following display of the final name in this list, i.e. Lindevall, the first name 'Linden' is again displayed and the search repeated. Thus, if the user misses the required name on the first pass through the list, he does not have to scroll through the entire list before the display again returns to the required name.

What is claimed is:

1. A method of searching an entry from a directory of alphanumeric entries stored in electronic form in the memory of an electronic device having a display and at least one user actuatable search switch, the method comprising the steps of:

(1) displaying one of said entries on the display and defining as a search key the first character of that entry;

(2) using said search switch to extend the search key to include one or more subsequent characters of the displayed entry; and (3) searching the directory of entries in alphabetical order to identify a first subsequent entry not commencing with the extended search key, and displaying the identified entry if one exists.

2. A method according to claim 1 and comprising in step (2) initially defining the search key as a null string and, upon activation of the search switch, redefining the search key as the first character of the displayed entry.

3. A method according to claim 1 and comprising extending the search key by one character each time the search switch is actuated.

4. A method according to claim 1 and comprising responding to actuation of a second search switch to shorten the extended search key by removing one or more of said subsequent characters from the search key.

5. A method according to claim 4 and comprising shortening the search key by one character each time the second search switch is actuated.

6. A method according to claim 1 and comprising redefining, following the search, the search key as the first character or characters of the identified entry, sufficient to distinguish the search key by one character from the beginning of the previously displayed name.

7. A method according to claim 6 and comprising repeating steps (b) and (c) based upon the new extended search key and the newly displayed entry.

8. A method according to claim 1 and comprising commencing searching of the directory of entries using the search key following actuation of the first mentioned search switch for a period of time greater than a predetermined initial time period.

9. A method according to claim 1 and comprising:
   repeating steps (b) and (c) based upon the new extended search key and the newly displayed entry;
   commencing searching of the directory of entries using the search key following actuation of the first mentioned search switch for a period of time greater than a predetermined initial time period; and
   following the elapse of each further predetermined time period after the initial time period, repeating step (c) using the new extended search key.

10. A method according to claim 9 and comprising, in response to actuation and subsequent deactuation of the search switch before elapse of the initial time period, determining if the next entry in alphabetical order commences with the extended search key and, If yes, then stopping the search and continuing to display the currently displayed entry and, If no, then defining the next entry as said identified entry and displaying that next entry.

11. A method according to claim 1 and comprising restricting the search in step (c) to those entries which differ from the Search Key only by the final character of the Search Key.

12. A method according to claim 11, wherein the search continues cyclically for the entries searched.

13. A method according to claim 1, further comprising making said search key visible on the display.

14. A method according to claim 13, wherein said making step comprises distinguishing said search key from other characters of the displayed entry.

15. A method according to claim 14, wherein said making step comprises underlining characters of the search key.

16. Apparatus having an electronic memory for storing an existing directory of alphanumeric entries, the apparatus further comprising:
   a display;
   at least one user actuatable search switch; and
   signal processing means coupled to said user actuatable switch, for detecting actuation thereof, and to said display, the signal processing means being arranged to display one of said entries in said existing directory on the display and to define as a search key the first character of that entry, to respond to actuation of the search switch by extending the search key to include one or more subsequent characters of the displayed entry to define an extended search key, to search the directory of entries in alphabetical order to identify a first subsequent entry not commencing with the extended search key, and to display the identified entry if one exists.

17. An apparatus according to claim 16, wherein said search key is visible on the display.

18. An apparatus according to claim 17, wherein said search key is distinguishable from other characters of the displayed entry.

19. An apparatus according to claim 18, wherein characters of the search key are underlined.

20. A mobile communications device comprising:
   a display;
   at least one user actuatable search switch; and
   signal processing means coupled to said user actuatable switch, for detecting actuation thereof, and to said display, the signal processing means being arranged to display one of said entries in an existing directory on the display and to define as a search key the first character of that entry, to respond to actuation of the search switch by extending the search key to include one or more subequent characters of a displayed entry to define an extended search key, to search the directory of entries in alphabetical order to identify a first subsequent entry not commencing with the extended search key, and to display the indentified entry if one exists.

21. A device according to claim 20, wherein said search key is visible on the display.

22. A device according to claim 21, wherein said search key is distinguishable from other characters of the displayed entry.

23. A device according to claim 22, wherein characters of the search key are underlined.

* * * * *